…

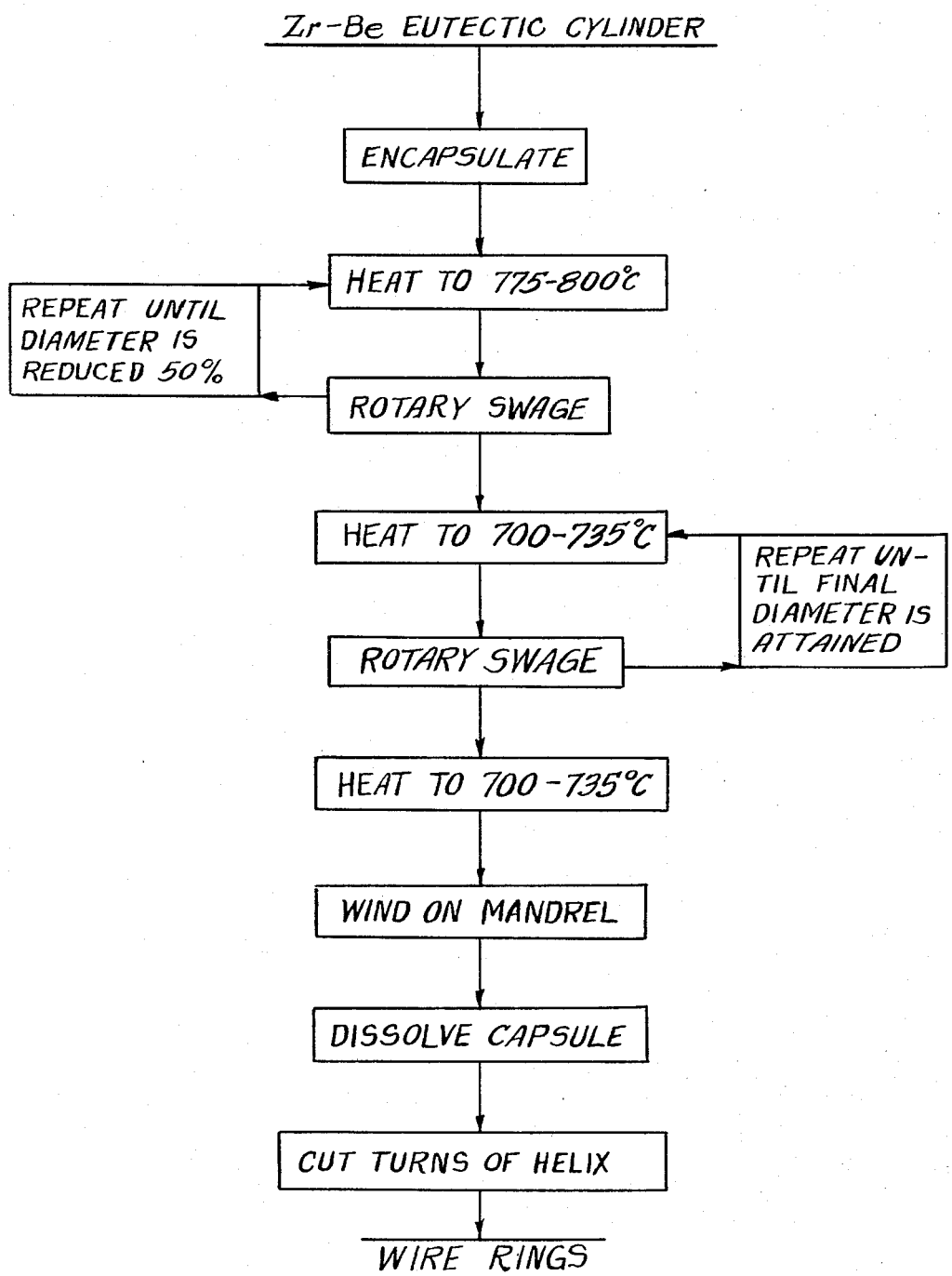

United States Patent Office 3,363,304
Patented Jan. 16, 1968

3,363,304
METHOD OF FABRICATING ZIRCONIUM-BERYLLIUM-EUTECTIC WIRE
Frank B. Quinlan, Richland, Wash., assignor to the United States of America as represented by the United States Atomic Energy Commission
Filed Apr. 6, 1965, Ser. No. 446,133
2 Claims. (Cl. 29—423)

ABSTRACT OF THE DISCLOSURE

The exceedingly brittle zirconium-beryllium eutectic (about 5% Be by weight) is made into a wire by enclosing it in a heavy stainless steel capsule and rotary swaging the assembly. The swaging is carried out at a temperature in the range 775°–800° C. until the diameter has been reduced about 50%. The temperature is lowered to 700°–735° C. for the remainder of the swaging. If wire rings are desired, the composite wire is wound on a mandrel while at its elevated temperature to form a helix. The stainless steel sheath is dissolved in sulfuric acid and the turns of the helix cut apart. A Zr-Be rod one half inch in diameter has been reduced to a wire .025 inch in diameter.

Contractual origin of the invention

This invention was made in the source of or under a contract with the United States Atomic Energy Commission.

Background

The object of this invention is to provide an improved method of forming wire from a zirconium-beryllium alloy having substantially the eutectic composition.

Zirconium-beryllium alloys are disclosed in Lustman and Kerze, "The Metallurgy of Zirconium" (1955), pages 446–447. As shown by the phase diagram, the two metals form a eutectic at about 5% by weight beryllium. Alloys of substantially the eutectic composition, i.e., those having melting points below 1000° C., are useful in the brazing of zirconium alloys, such as the well known zircaloy-2, which has the following composition by weight:

| | Percent |
|---|---|
| Tin | 1.5 |
| Iron | 0.12 |
| Chromium | 0.10 |
| Nickel | 0.05 |
| Zirconium | balance. |

Satisfactory brazing alloys can also be made from about 5% beryllium and about 95% zircaloy-2, since the additional alloying elements do not appreciably affect the physical properties of the zirconium-beryllium eutectic.

Typical compositions of the braze alloys are:

(a)

| | Percent |
|---|---|
| Beryllium | 5.00–5.25 |
| Zirconium | balance. |

(b)

| | |
|---|---|
| Tin | 1.20–1.70 |
| Iron | 0.07–0.20 |
| Chromium | 0.05–0.15 |
| Nickel | 0.03–0.06 |
| Beryllium | 5.00–5.25 |
| Zirconium | balance. |

By the term "a zirconium-beryllium alloy having substantially eutectic composition," I therefore intend to include the alloys consisting essentially of beryllium and zirconium and also those including other constituents, such as those present in zircaloy-2, which do not substantially affect the physical properties of the eutectic.

Wire formed of the above brazing alloys is utilized in certain fabrication methods. In some of the brazing operations it is necessary that the wire be in the form of rings of one or two inches diameter. The fabrication of the wire, and particularly the rings, has been extremely difficult since the alloy is exceedingly brittle—almost as brittle as glass. Moreover, it is subject to oxidation when heated and, because of the toxicity of beryllium, is hazardous to handle when heated. I have devised a process for the making of such wire.

Summary of invention

My invention comprises enclosing a rod of the zirconium-beryllium-eutectic alloy in a heavy capsule of stainless steel, heating it to certain critical temperatures, which will be discussed below, subjecting the capsule to rotary swaging until the rod has been changed into a fine wire, and dissolving the capsule from the wire. If the rings referred to above are desired, the alloy and "capsule," now an exceedingly elongated composite wire, are formed into a helix before the "capsule" is dissolved.

Description of the drawing

The drawing shows a flow diagram of the process.

Detailed description

The process will now be described with reference to a specific example.

A zirconium-beryllium alloy having substantially the eutectic composition is cast into a rod eight inches long and one-half inch in diameter. The alloy rod is inserted in a stainless steel tube having an inside diameter of one-half inch, an outside diameter of one inch, and a length of ten inches. Also, one-inch plugs of stainless steel are welded under vacuum into the ends of the tube, forming a capsule. The capsule is then heated to 800° C. and swaged in a rotary swage. The temperature must be very close to 800° C. at this point. If it is higher, the alloy will react with the stainless steel. If it is below about 775° C., the alloy will be too brittle to swage properly due to the presence of peculiar slip planes in the crystals.

The swaging is repeated about ten times with reheating before each pass until the outside diameter of the capsule has been reduced to about one-half inch. This initial swaging at 800° C. produces a change in the crystal structure of the alloy so that it can now be swaged at a lower temperature. The use of lower temperature in subsequent operations is desirable because the increased surface area increases the possibility of a reaction between the alloy and the stainless steel. I have found 725° C. to be the optimum temperature for the subsequent operations.

The rod is now swaged until the final desired dimensions are produced. In this operation I employ a tubular furnace which terminates very close to the dies of the rotary swage. The rod repeatedly passes through the furnace into the swage and is reduced about 10% in each pass. The treatment is continued until the outside diameter of the composite wire is about $89/1000$ inch. At this time the diameter of the alloy wire is about $25/1000$ inch and the composite wire is about sixty to seventy feet long. If the alloy wire is desired in the form of rings, the composite wire, while at its elevated temperature, is wound on a mandrel to form a helix of the desired diameter. The composite wire is then immersed in a 20% sulfuric acid solution at about 60° to 70° C. This dissolves the stainless steel but not the alloy. The helix is then cut to give the desired rings.

The stainless steel capsule serves several purposes in this process. First, it acts as a heat sink to prevent rapid changes in temperature of the alloy. The latter must be held within very narrow ranges. During the initial swaging, the temperature must be kept within the range 775° C. to 800° C. to achieve satisfactory operation. In the second stage it should be held within the range of 700° C. to 735° C. and, preferably, as near as possible to 725° C. I found that if the alloy were swaged bare or with only a thin coating such as is used in swaging tungsten, the rapid cooling made satisfactory operation impossible. Moreover, the alloy wire, even within these ranges, is very brittle as compared with, say, tungsten. If one attempts to swage it directly, the vibration set up causes the wire to shatter. The stainless steel sheath confines and restrains the alloy so as to preserve its integrity. Moreover, as mentioned above, the alloy is subject to oxidation and, because of its beryllium content, will create atmospheric hazards if it is heated bare. The stainless steel sheath prevents this action.

The inside diameter of the capsule should be such that it will fit closely over the alloy rod. Since it is to function as a heat sink, the cross section of the capsule should be several times that of the rod. A convenient rule to follow is that the initial thickness of the capsule should be at least equal to the diameter of the rod. The closure of the capsule should be made under vacuum in order to eliminate any possibility of oxidation or contamination of the alloy by entrapped gases.

The swage used is a conventional rotary swage such as that shown and described on pages 206 and 207 of "Tungsten" by Li and Wang, second edition (1947).

While I have described my method in detail, it will be understood that I wish to be limited solely by the scope of the appended claims.

The embodiments of the invention in which an exclusive property or privilege is claimed are defined as follows:

1. A method of forming a wire of a zirconium-beryllium alloy having substantially the eutectic composition which comprises casting said alloy in the form of a rod, enclosing said rod in a heavy stainless steel capsule, heating said rod and capsule to a temperature in the range of 775° C. to 800° C., swaging said capsule until its diameter is reduced by approximately 50% while maintaining the temperature in the aforementioned range, swaging said capsule at a temperature in the range of 700° to 735° C. until its diameter has been reduced to about one-tenth its original diameter, and thereafter dissolving said stainless steel in hot sulfuric acid, leaving said alloy in the form of wire.

2. A process as defined in claim 1 and further comprising winding the composite wire into a helix before dissolution of the stainless steel.

References Cited
UNITED STATES PATENTS

| | | | |
|---|---|---|---|
| 2,067,746 | 1/1937 | Zabel. | |
| 2,653,494 | 9/1953 | Crentz | 29—423 |
| 2,960,763 | 11/1960 | Reichl | 29—423 |
| 3,127,671 | 4/1964 | Hayes | 29—423 |
| 3,277,564 | 10/1966 | Webber et al. | 29—423 X |

JOHN F. CAMPBELL, *Primary Examiner.*

PAUL M. COHEN, *Assistant Examiner.*